United States Patent
Karg et al.

(10) Patent No.: US 10,502,340 B2
(45) Date of Patent: Dec. 10, 2019

(54) SYSTEM FOR A VALVE SETUP

(71) Applicant: Honeywell International Inc., Morristown, NJ (US)

(72) Inventors: Karen Karg, Champlin, MN (US); Pallavi Dharwada, Minneapolis, MN (US); Henry Nahurski, Minneapolis, MN (US); Donald J. Kasprzyk, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 70 days.

(21) Appl. No.: 14/828,316

(22) Filed: Aug. 17, 2015

(65) Prior Publication Data
US 2017/0051844 A1   Feb. 23, 2017

(51) Int. Cl.
*G05B 19/409* (2006.01)
*F16K 37/00* (2006.01)
*F23K 5/00* (2006.01)
*F23N 5/24* (2006.01)
*G05D 7/06* (2006.01)

(52) U.S. Cl.
CPC ............ *F16K 37/005* (2013.01); *F23K 5/007* (2013.01); *F23N 5/24* (2013.01); *G05D 7/0635* (2013.01); *F23K 2900/05001* (2013.01); *F23N 2025/04* (2013.01); *F23N 2027/16* (2013.01); *F23N 2027/18* (2013.01); *F23N 2027/20* (2013.01); *F23N 2031/10* (2013.01); *F23N 2031/18* (2013.01)

(58) Field of Classification Search
CPC ............ F23N 2025/04; F23N 2027/16; F23N 2027/18; F23N 2027/20; G05B 19/409; Y10S 15/965; Y10S 15/97
See application file for complete search history.

(56) References Cited

U.S. PATENT DOCUMENTS

| | | | |
|---|---|---|---|
| 4,692,574 A | 9/1987 | Berkhof | |
| 4,785,846 A | 11/1988 | Kragten | |
| 5,304,757 A | 4/1994 | Hensel | |
| 5,460,628 A * | 10/1995 | Neuwirth | A61B 18/08 606/27 |
| 5,990,798 A | 11/1999 | Sakai | |
| 6,901,560 B1 | 5/2005 | Guerlain et al. | |
| 7,209,806 B2 | 4/2007 | Timm | |
| 7,352,287 B2 * | 4/2008 | Rupert | G05D 16/2066 137/102 |
| 7,494,524 B1 * | 2/2009 | Lehmann, Jr. | B01D 46/0028 454/238 |
| 2001/0032948 A1 | 10/2001 | Austin | |

(Continued)

OTHER PUBLICATIONS

Office Action for EP Application No. 16182476.8, dated Oct. 23, 2017.

*Primary Examiner* — Marina A Tietjen
*Assistant Examiner* — Paul J Gray

(57) ABSTRACT

A system for checking high fluid pressure and low fluid pressure limit switches for valves and fluid supply to a fluid consumption appliance. The system may incorporate one or more pressure sensors at a fluid valve to detect an amount of fluid pressure. The one or more pressure sensors may be connected to a processor. The high fluid pressure and low fluid pressure sensor limit switches may also be connector to the processor. A display and user control may be connected to the processor.

5 Claims, 14 Drawing Sheets

(56) References Cited

U.S. PATENT DOCUMENTS

| | | |
|---|---|---|
| 2005/0263109 A1 | 12/2005 | Daniels et al. |
| 2007/0119225 A1 | 5/2007 | McFarland et al. |
| 2010/0071672 A1 | 3/2010 | Grunwald et al. |
| 2010/0185225 A1* | 7/2010 | Albrecht ............... A61B 5/036 606/191 |
| 2010/0306694 A1* | 12/2010 | Conzola ............. G06F 3/04847 715/786 |
| 2012/0273066 A1 | 11/2012 | Faillat et al. |
| 2013/0014057 A1* | 1/2013 | Reinpoldt ........... G06F 3/04847 715/833 |
| 2013/0153042 A1 | 6/2013 | Young et al. |

* cited by examiner

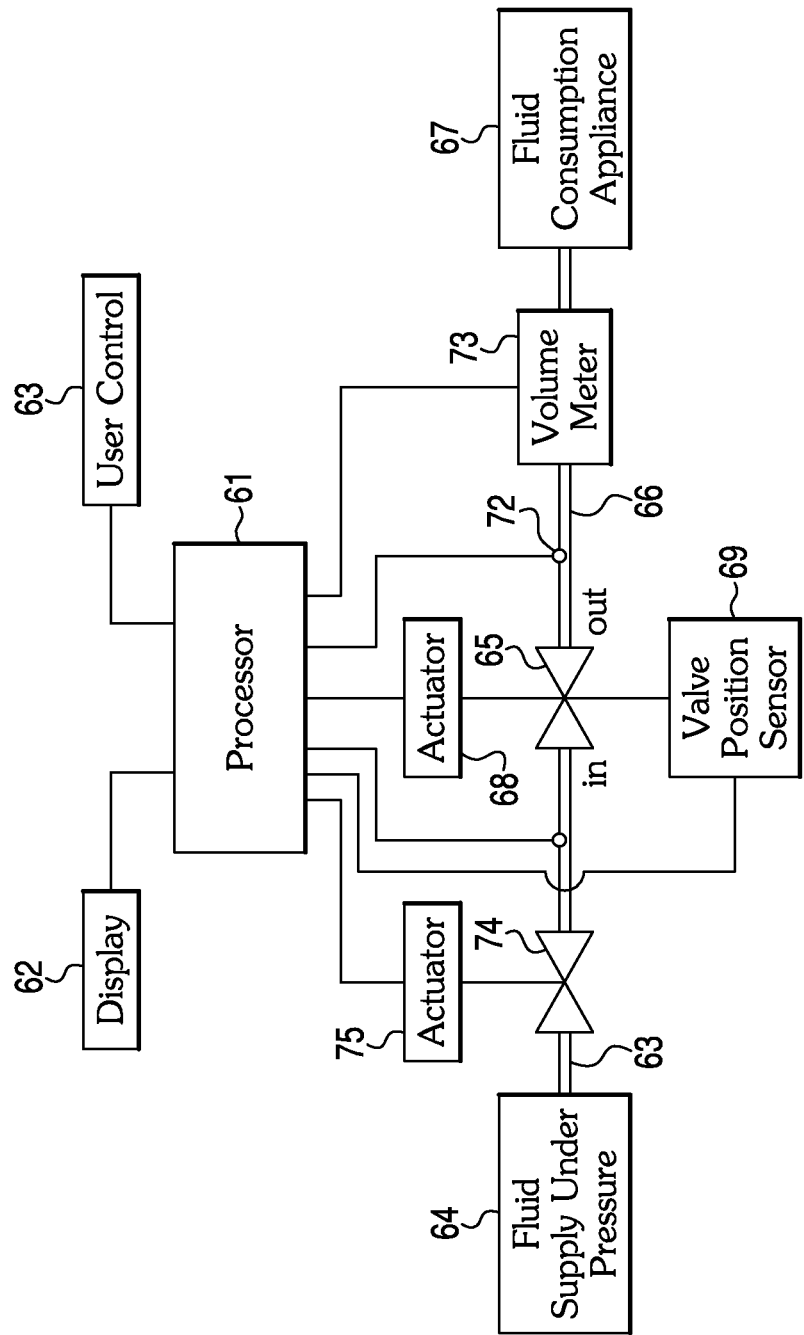

FIG. 3

SYSTEM FOR A VALVE SETUP

BACKGROUND

The present disclosure pertains to valves, setting up valves, and more particularly to pressures of fluid at a valve.

SUMMARY

The disclosure reveals a system for checking high fluid pressure and low fluid pressure limit switches for valves and fluid supply to a fluid consumption appliance. The system may incorporate one or more pressure sensors at a fluid valve to detect an amount of fluid pressure. The one or more pressure sensors may be connected to a processor. The high fluid pressure and low fluid pressure sensor limit switches may also be connector to the processor. A display and user control may be connected to the processor.

BRIEF DESCRIPTION OF THE DRAWING

FIG. 1a is a diagram of a an equipment layout for the present valve setup;

FIG. 3 is a diagram of a screen for a high gas and low gas pressure setup where high gas and low gas lockout types may be selected;

DESCRIPTION

Figure 1:
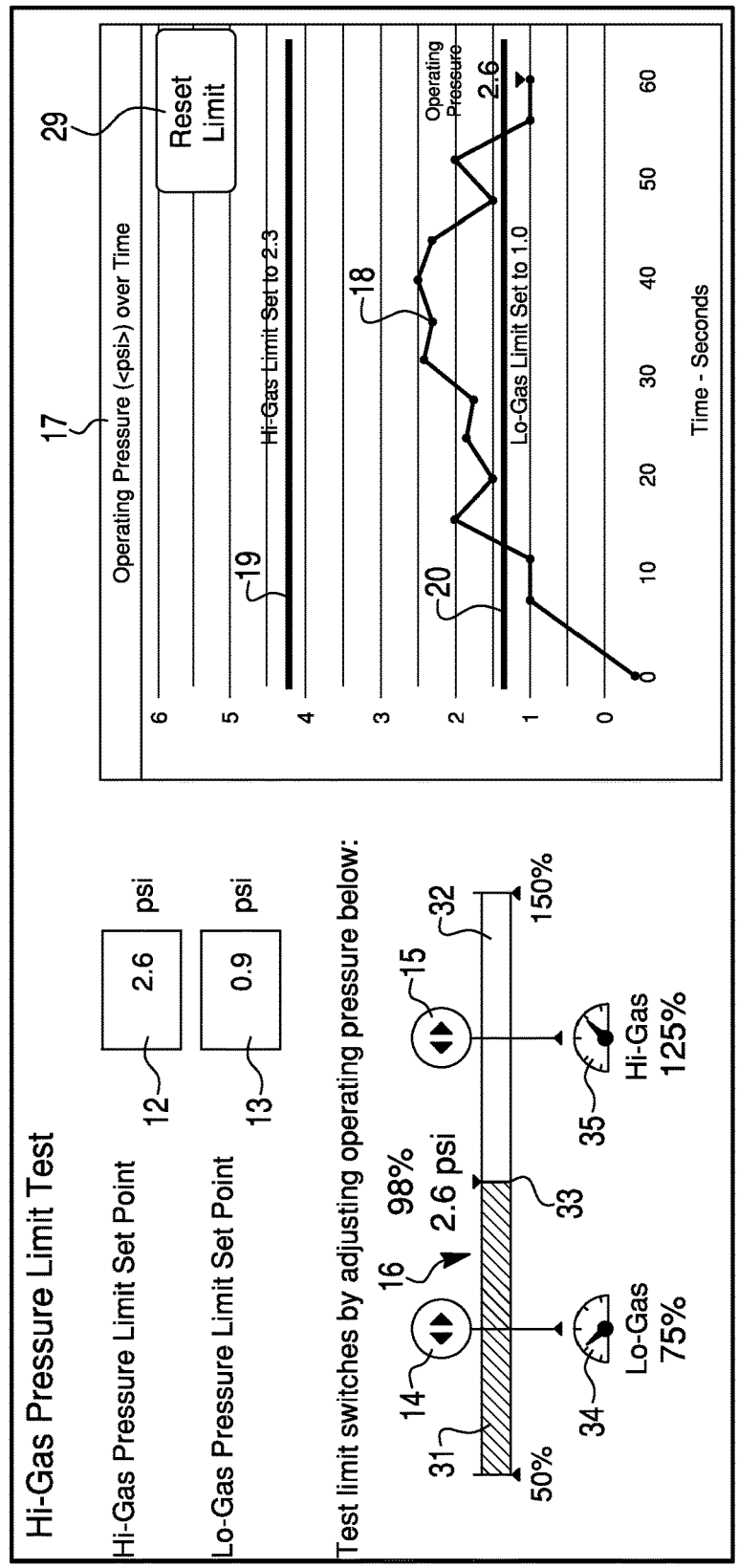
FIG. 1 is a diagram of a screen for a high gas pressure limit test.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

In commercial and industrial burner applications, safety codes may sometimes require a high gas pressure switch and a low gas pressure switch. To set these switches, the user may have to take pressure readings and then set a mechanical pressure switch to a pressure setting on a scale that is not very accurate. The inaccuracy of the pressure readings taken by the user and the inaccuracy of the setting procedure may cause nuisance lockouts. To check the high and low gas pressure switches, the user may usually turn the set knob until the limit trips out. Then the user may turn the knob back to its original setting. An issue may be that the user could forget to reset the limit to the original setting or forget what the setting was. While the system is running, the user does not necessarily know how close that the pressure switch is to tripping out.

The present electronic pressure limit system, used with a human machine interface (HMI) panel, may make setting and checking the limits user friendly and mistake proof.

Patent application Ser. No. 13/326,357, filed on Dec. 15, 2011, is hereby incorporated by reference. Application Ser. No. 13/326,357 may provide some background for the operation of a related system. The present disclosure may emphasize a user interface part of the present system. The user interface may allow an operator to touch a single button to set the limit as a percent of the actual pressure. Setting errors may be eliminated. A featured way to test the limit may be shown in FIG. 1 that is a diagram of a screen shot of the HMI. After the limits are set, an operator may touch one of the limit bar icons (such as a Lo-Gas symbol 34) and move it past the actual pressure (shown as 2.6 PSI in the screen shot 11 of FIG. 1) to verify that the limit switch tripped and that the system was locked out. As soon as the system locks out, the limit may be automatically set back to the original limit setting with a user interface not necessarily needed.

Figure 3:
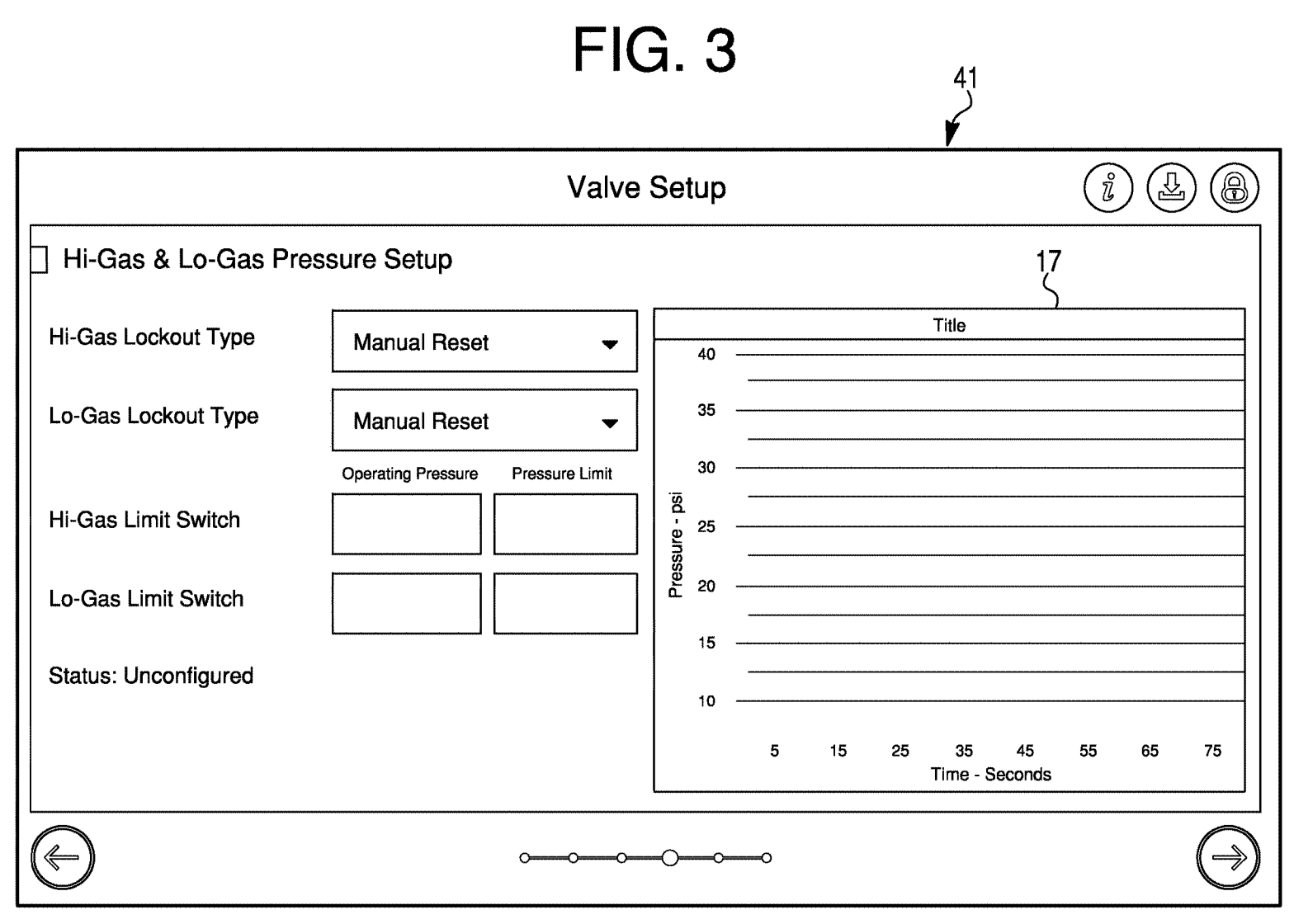

A feature is that the actual pressure may be shown in real time via a graph 17 like that of FIG. 3 that also shows the high and low limits 19 and 20, respectfully. This may allow an operator or user to see how close one is to the limits and adjust the limits if needed to prevent unwanted limit trips caused by future pressure variations.

Another feature is that the operator may accurately change the pressure limits by changing the limit percentage and immediately see limit bars move and note how close the system operating pressure is from the limits.

Still another feature is that the operator may see historical data plotted as a function of time and see historically when and note how long the system has been operating near the limits.

A slider bar 16 with the high and low gas pressure switch icons 34 and 35 on either end may describe the present system as shown in a diagram of FIG. 1. The present system may be used in two instances. One instance is when the high gas pressure switch is being tested. Another instance is when the low gas pressure switch is being tested.

A touch interactive system or a mouse input driven display may reveal the slider. A user may grab any one of the limit switch icons at a time to slide it forward or backward on the slider bar 16 which indicates the current operating pressure. At a point where the limit switch meets the operating pressure, the switch may trip eliminating multiple rounds of adjustments by the users. The same process may be repeated for other like switches.

Once a switch is tested and the user exits the screen, the switch limits may be auto-restored to the original settings without having the user to memorize them and restore them back from other test settings.

Figure 2:
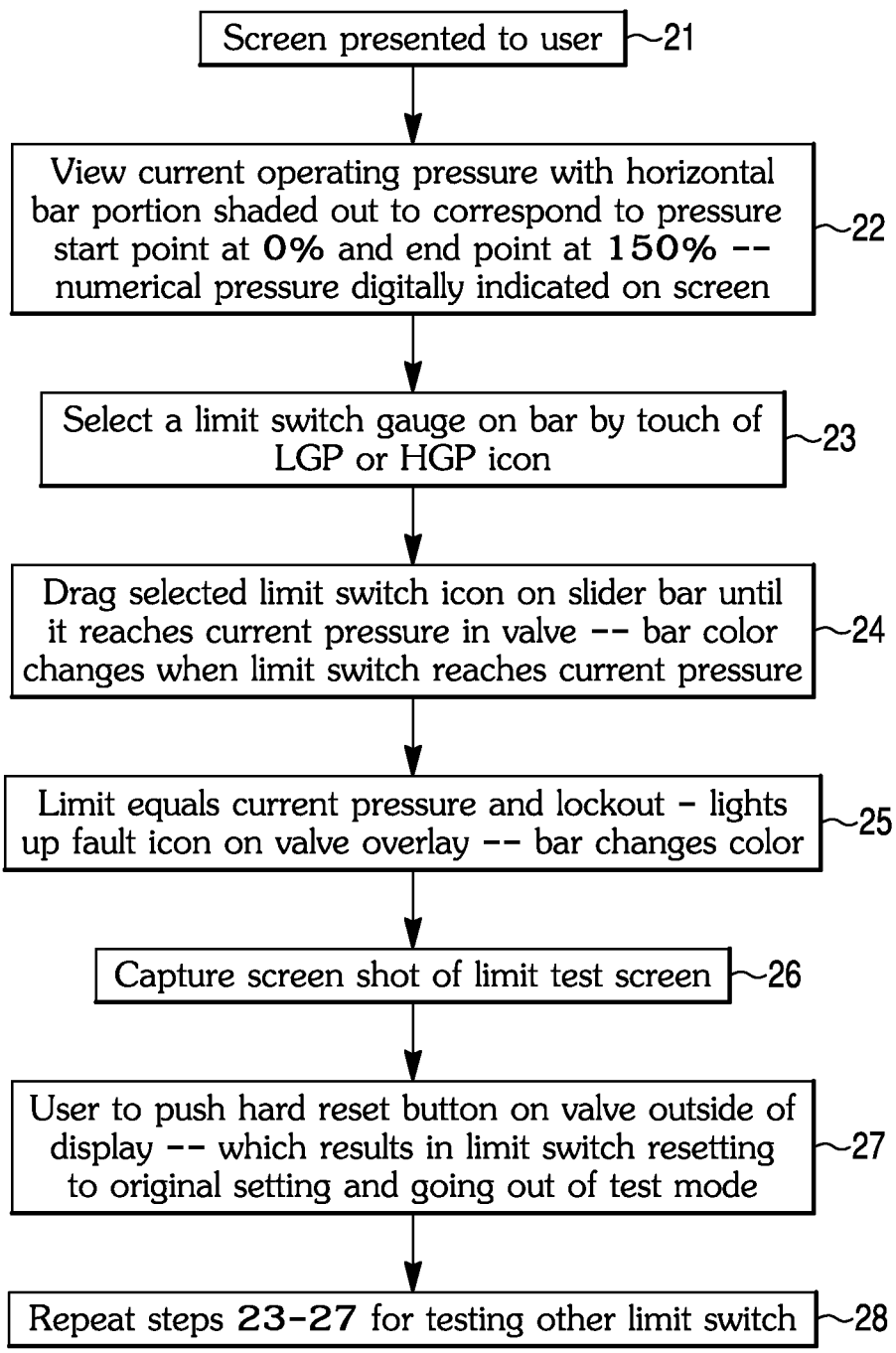
FIG. 2 is a diagram of a workflow for testing limit switches.

FIG. 2 is a diagram of a workflow that may test limit switches for "Hi-Gas Pressure" and "Lo-Gas Pressure". First, a user may be presented with a display screen that provides the current operating pressure indicated graphically using a horizontal bar where a portion of the horizontal bar is filled in with a first color (e.g., blue) proportionate to the corresponding pressure value dynamically. For example, a starting point of the slider bar may considered as being at 50 percent and the ending point as 150 percent of pressure which are displayed at both ends of the slider bar correspondingly. A numerical pressure value and percentage may be indicated on top of the slider bar.

Second, the user may select one of the limit switch gauges on the slider bar by touching the respective icon for either a LGP or HGP test.

Third, one may drag the selected limit switch icon on the slider bar until it reaches the current operating pressure of the valve. The slider bar color may change when the limit switch reaches the current operating pressure, to red. Fourth, at this point, the limit may equal the current operating pressure and the control lockouts (opening the interlock relay and then lighting up the fault icon on the valve overlay). This may be indicated graphically by changing the limit switch icon from the first color to a second color (e.g., red) and the filling in the horizontal slider bar changing from the first color to the second color, i.e., from blue to red. An operator may now capture a screenshot of the limit test screen.

Fifth, at this point, the user may be indicated to push the hard reset button on the valve (external to the display). Upon hitting the reset button on the valve, the limit switch may reset itself to the original setting and get out of the test mode in a noticeable time period. Sixth, a user may repeat the second to fifth items for the other limit switch that should be tested.

FIG. 1 is a diagram of a screen 11 for a high gas ("Hi-Gas") pressure limit test. For example, the high pressure limit set point 12 may be set at 2.6 psi and the low pressure set point may be put at 0.9 psi. The test limit points and respective switches 14 and 15 may be adjusted on slider bar 16. Limit switches 14 and 15 may be tested by adjusting the operating pressure which is indicated above the center of bar 16. In this instance, the operating pressure may be indicated as 2.6 psi situated at 98 percent.

A graph 17 shows operating pressure versus time with a trace 18. Also shown are high and low limits set to 2.3 psi and 1.0 psi, respectively, as indicated by horizontal lines or bars 19 and 20. The limits may be returned to their original settings by clicking a reset limit switch 29.

FIG. 1a is a diagram of a layout having a processor 61, a display 62 and user control 63 connected to processor 61. A fluid line 63 may be connected to a fluid supply 64 and to an input port of a valve 65. A fluid line 66 may be connected an output port of valve 65 and to a fluid consumption appliance 67. Valve 65 may be connected to an actuator 68. Actuator 68 may be connected to processor 61. A sensor 69 for detecting a position of valve 65 may be connected to processor 61. A sensor 71 may be placed in fluid line 63 to detect fluid pressure at the input port of valve 65 and be connected to processor 61. A sensor 72 may be placed in fluid line 66 to detect fluid pressure at the output port of valve 65. A volume flow meter 73 may be placed in line 66 and connected to processor 61. Optionally, a safety valve 74 may be placed in supply line 63 with its actuator 75 connected to processor 61.

FIG. 2 is a diagram of a workflow for testing limit switches for high gas pressure and low gas pressure. The activity indicated in the symbols of the diagram in FIG. 2 may be referred to with various nomenclature such as steps or workflow steps. A screen similar to that shown in the diagram of FIG. 1 may be presented on a display for viewing by a user in symbol 21. The user may view a current operating pressure with a horizontal bar 16 portion shaded out to correspond to a pressure start point 31 at 50 percent and an end point 32 at 150 percent, according to symbol 22. Numerical pressure may be noted at a point 33 situated between start point 31 and end point 32. A limit switch gauge on bar 16 may be selected by a touch or control of a low gas pressure (LGP) icon 34 or a high gas pressure (HGP) icon 35, as indicated in symbol 23.

A selected limited switch icon 34 or 35 may be dragged on slider bar 16 until it reaches a current operating pressure in a valve external to the display. The color of bar 16 may change when the selected limit switch reaches the current operating pressure according to symbol 24.

Per symbol 25, when a limit equals the current operating pressure and lockout, a fault icon on a valve overlay may light up and bar 16 may change color. At symbol 26, a screen shot of the limit test screen 11 may be captured.

According to symbol 27, the user may press a hard reset button on the valve outside of the display to result in the limit switch to be reset to its original setting and leave the test mode. At symbol 28, the steps as noted in symbols 23-27 may be repeated for testing the other limit switch.

A processor connected to the display and limit switches may have a communication setup with the valve where the current operating pressure is measured. An appropriate address for the valve may be determined. The valve may be connected. One or more other valves may be connected and one or more present valves may be disconnected. Other settings may be made during the communication set up. The settings may be made on a screen of a display by the user. Settings of a valve setup may incorporate units, access privileges, full-air ratio and ignition, high gas and low gas pressure, a valve proving sequence, a bubble leak test, and/or other items.

Figure 4:
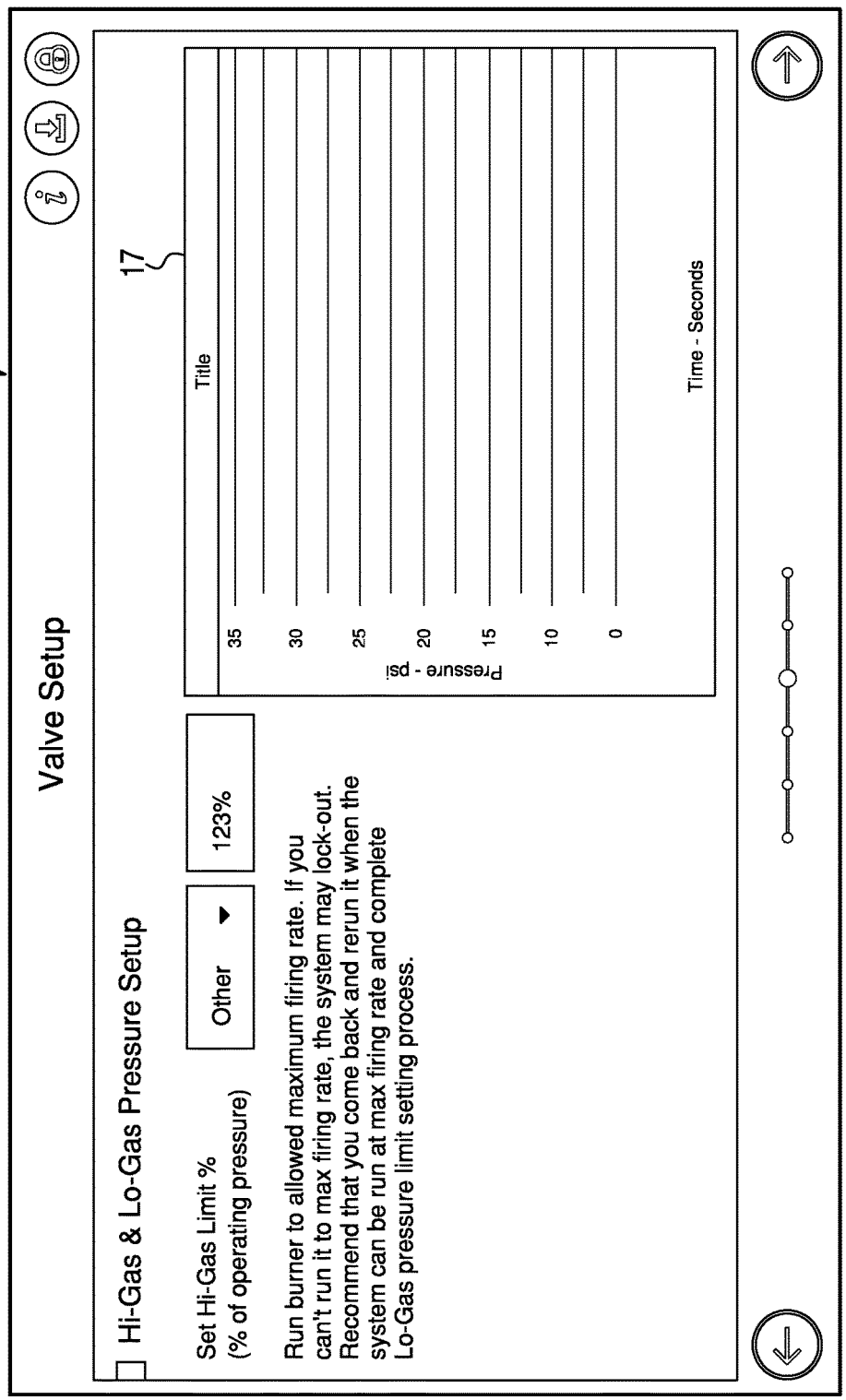
FIG. 4 is a diagram of a screen that reveals a setting of a high gas pressure to a percentage of the operating pressure.
Figure 5:
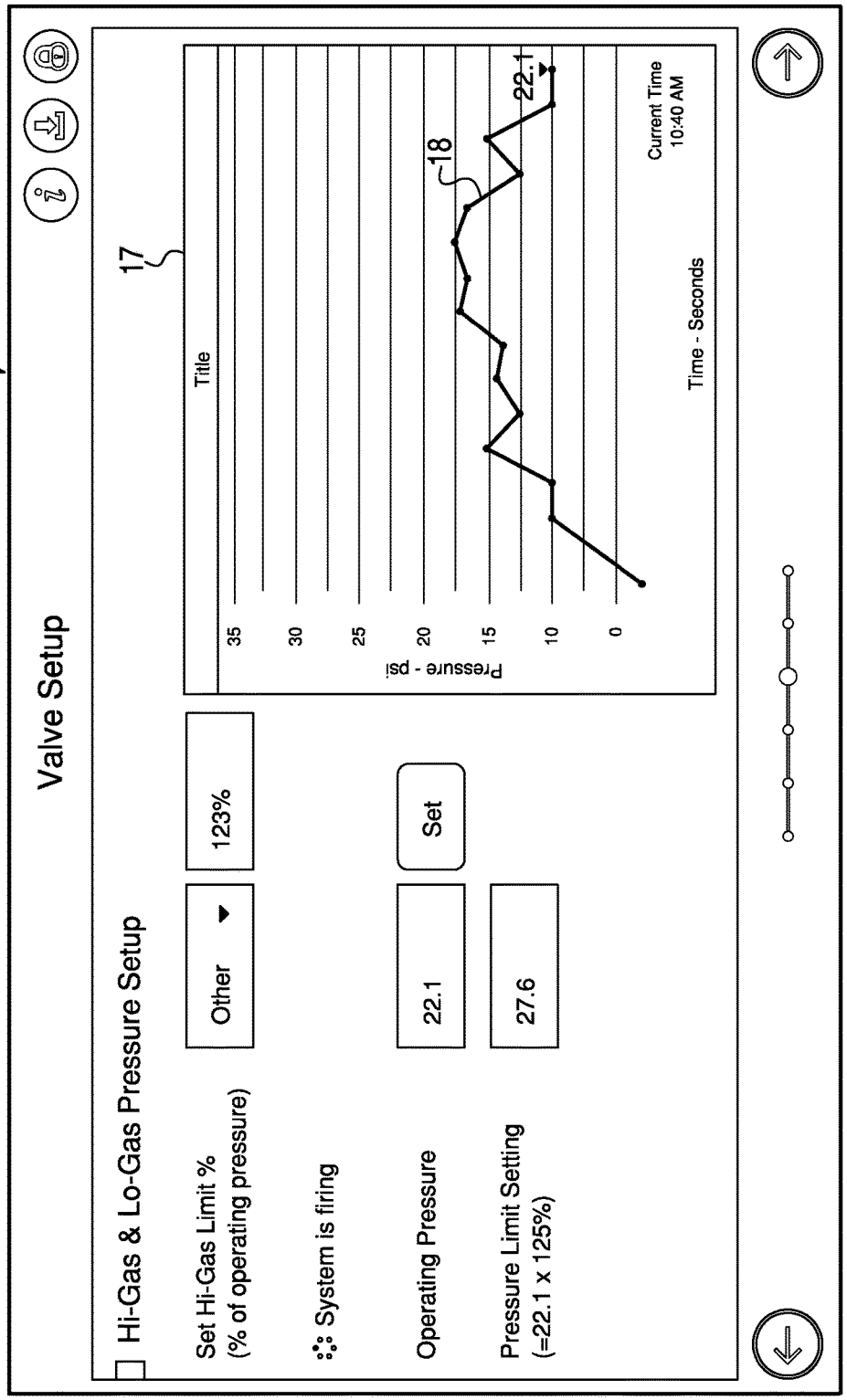
FIG. 5 is a diagram of a screen that reveals an entry of the high gas setting where the operating pressure and the pressure limit setting are indicated.
Figure 6:
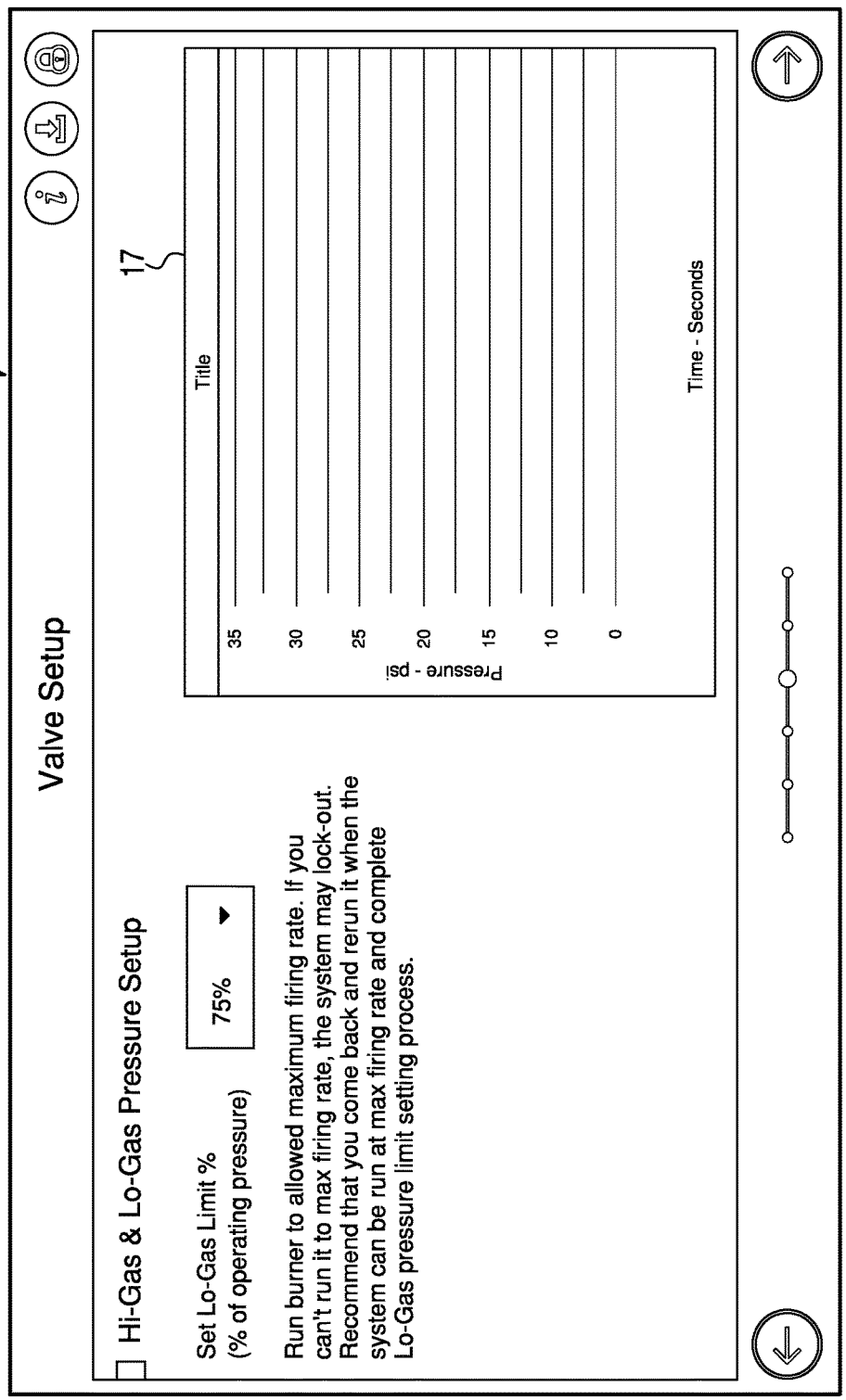
FIG. 6 is a diagram of a screen that reveals a setting of a low gas pressure to a percentage of the operating pressure.
Figure 7:
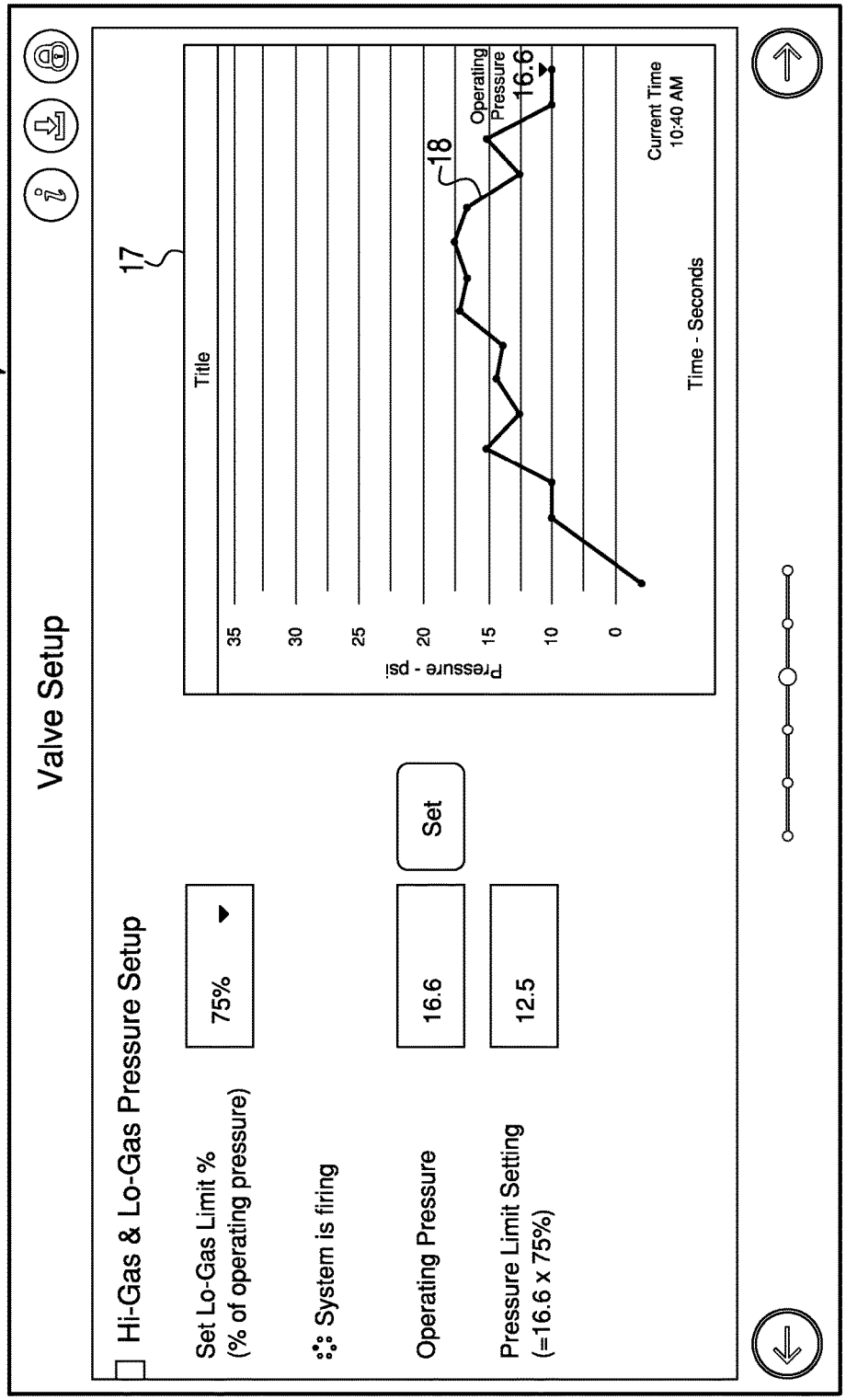
FIG. 7 is a diagram of a screen that reveals an entry of a low gas setting where operating pressure and the pressure limit setting may be indicated.
Figure 8:
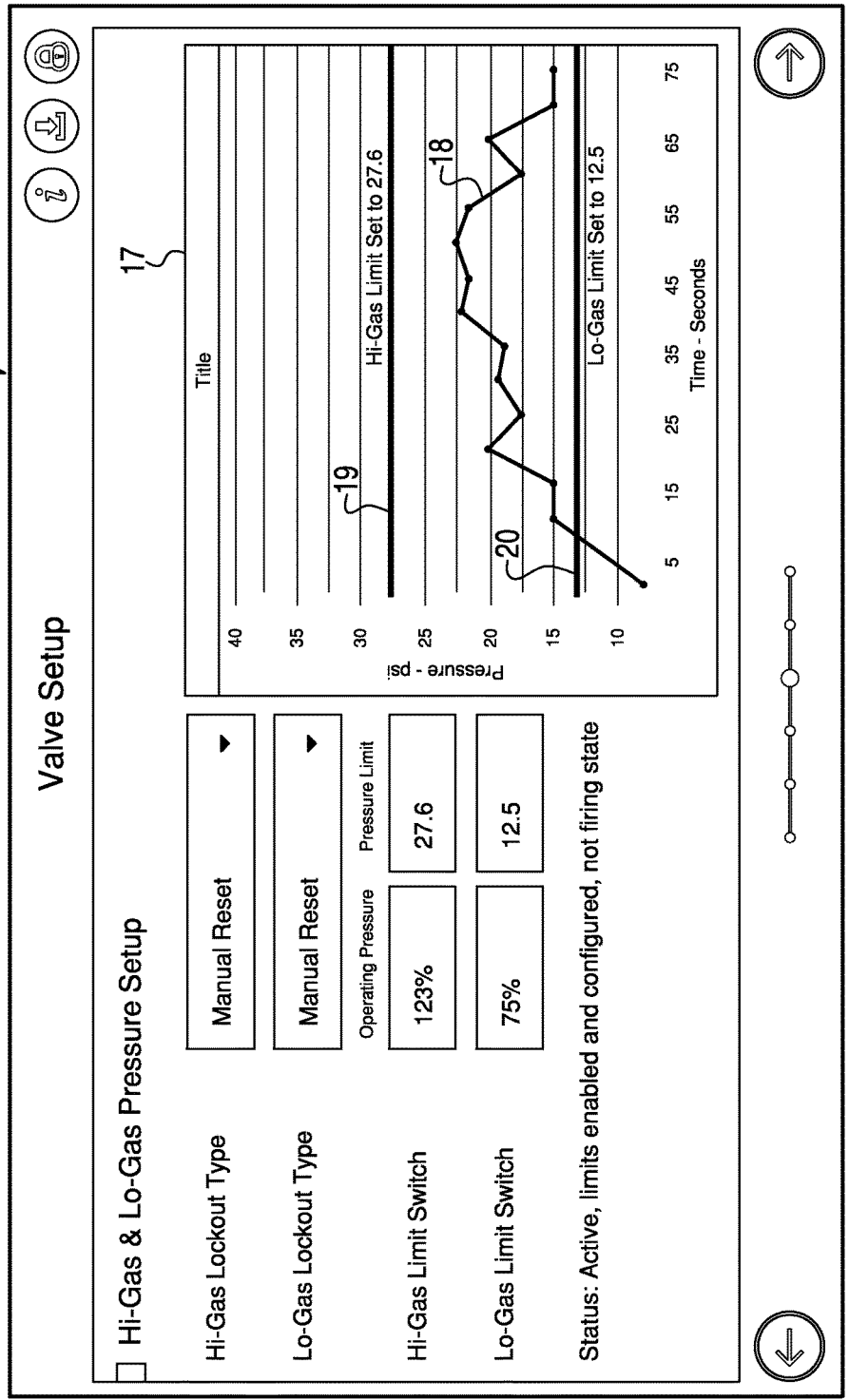
FIG. 8 is a diagram of a screen that reveals the appearance of the settings of the high gas limit switch and the low gas limit switch in terms of percentage of operating pressure and the resulting pressure limits and a bar in a graph.

FIG. 3 is a diagram of a screen 41 for a high gas and low gas pressure setup where high gas and low gas lockout types may be selected. Screen 42 of FIG. 4 reveals a setting of a high gas pressure to a percentage of the operating pressure. Screen 43 of FIG. 5 reveals an entry of the high gas setting where the operating pressure and the pressure limit setting are indicated. A screen 44 of FIG. 6 reveals a setting of a low gas pressure to a percentage of the operating pressure. A screen 45 of FIG. 7 reveals an entry of the low gas setting where operating pressure and the pressure limit setting may be indicated. Screen 46 of FIG. 8 reveals the appearance of the settings of the high gas limit switch and the low gas limit switch in terms of percentage of operating pressure and the resulting pressure limits and bar 19 and 20 in graph 17.

Figure 9:
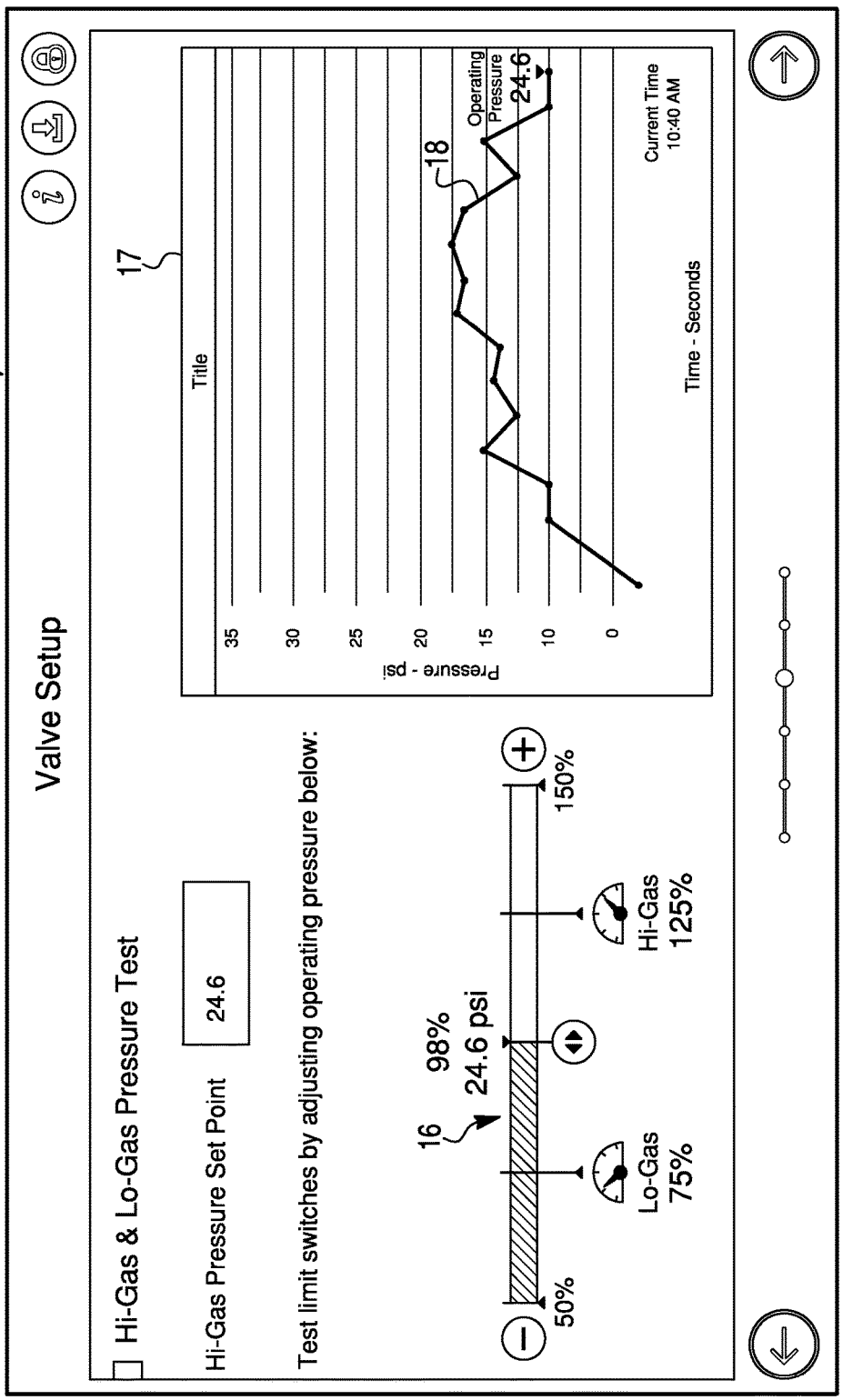
FIGS. 9 and 10 are diagrams of screens that relate the limit switches to be tested by adjusting the pressure on the bar for the high gas pressure and low gas pressure set points, respectively.
Figure 10:
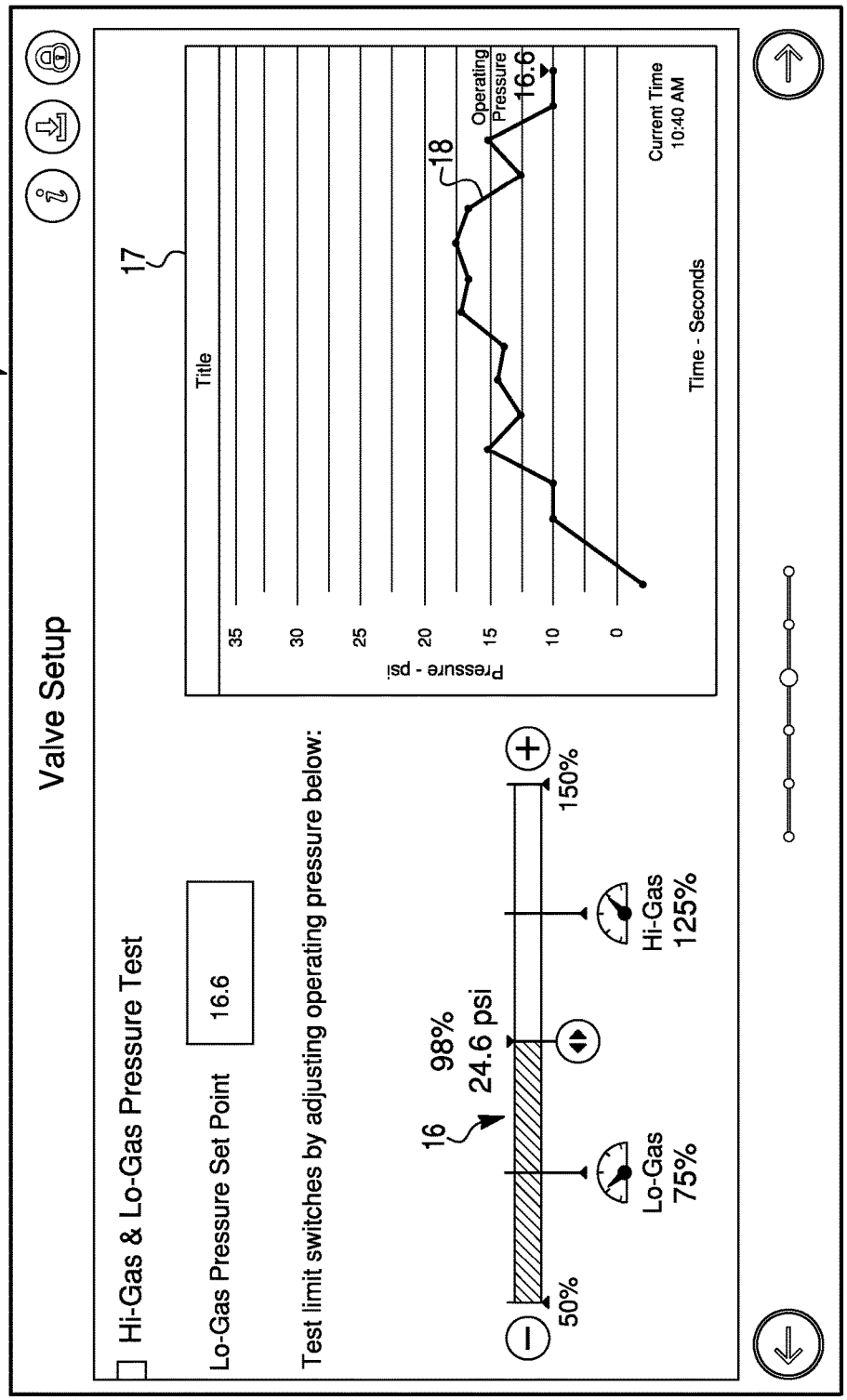
Figure 11:
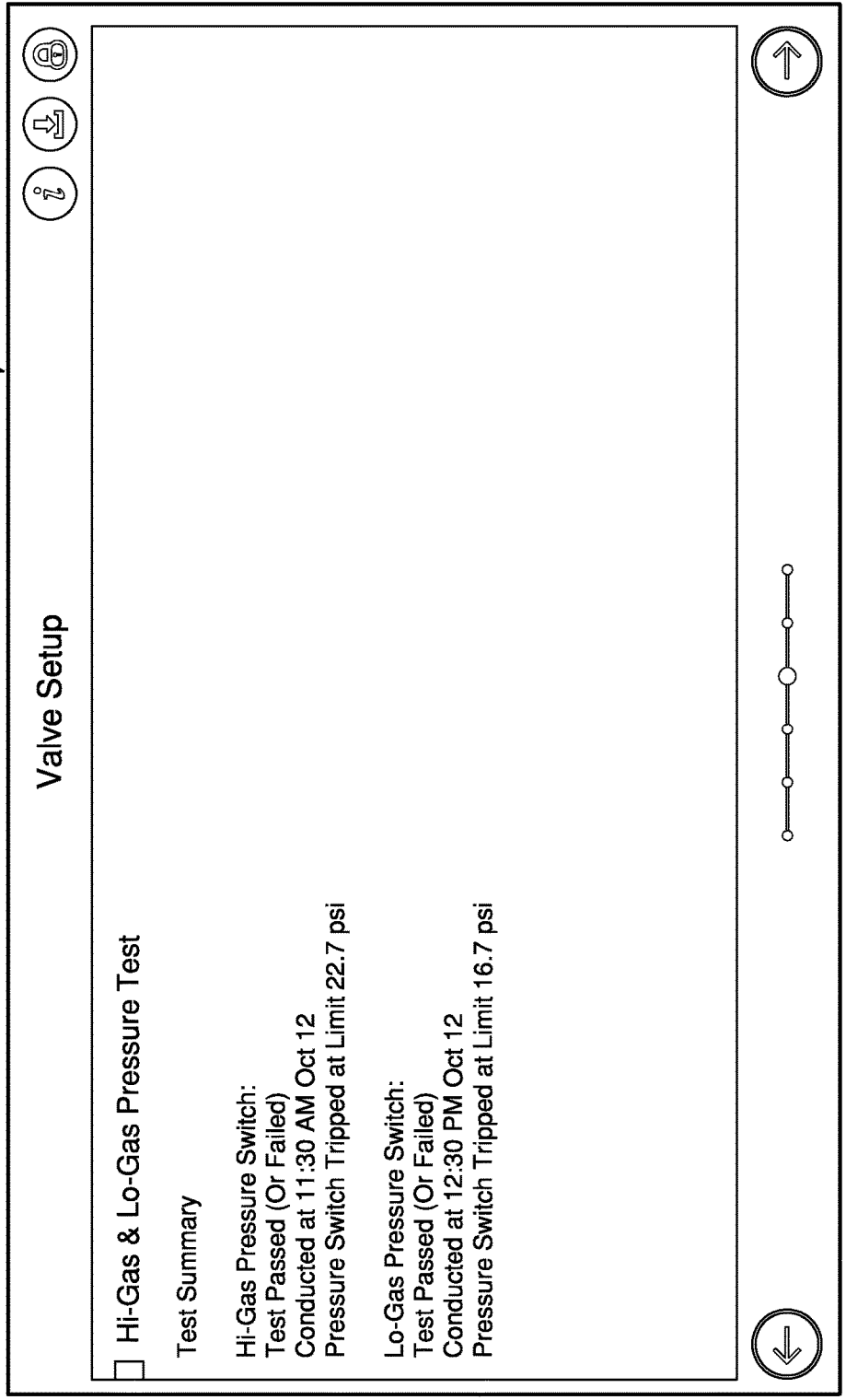
FIG. 11 is a diagram of a screen that shows a test summary of the high gas pressure switch and the low gas pressure switch.

Screens 47 and 48 of FIGS. 9 and 10 relate the limit switches to be tested by adjusting the pressure on bar 16 for the high gas pressure and low gas pressure set points, respectively. FIG. 11 is a diagram of a screen 49 that shows a test summary of the high gas pressure switch and the low gas pressure switch. The high gas pressure switch may be noted to have tripped at a limit of 22.7 psi and the low gas pressure switch may be noted to have tripped at a limit of 16.7 psi. These results are illustrative examples but there could be other values.

Figure 12:
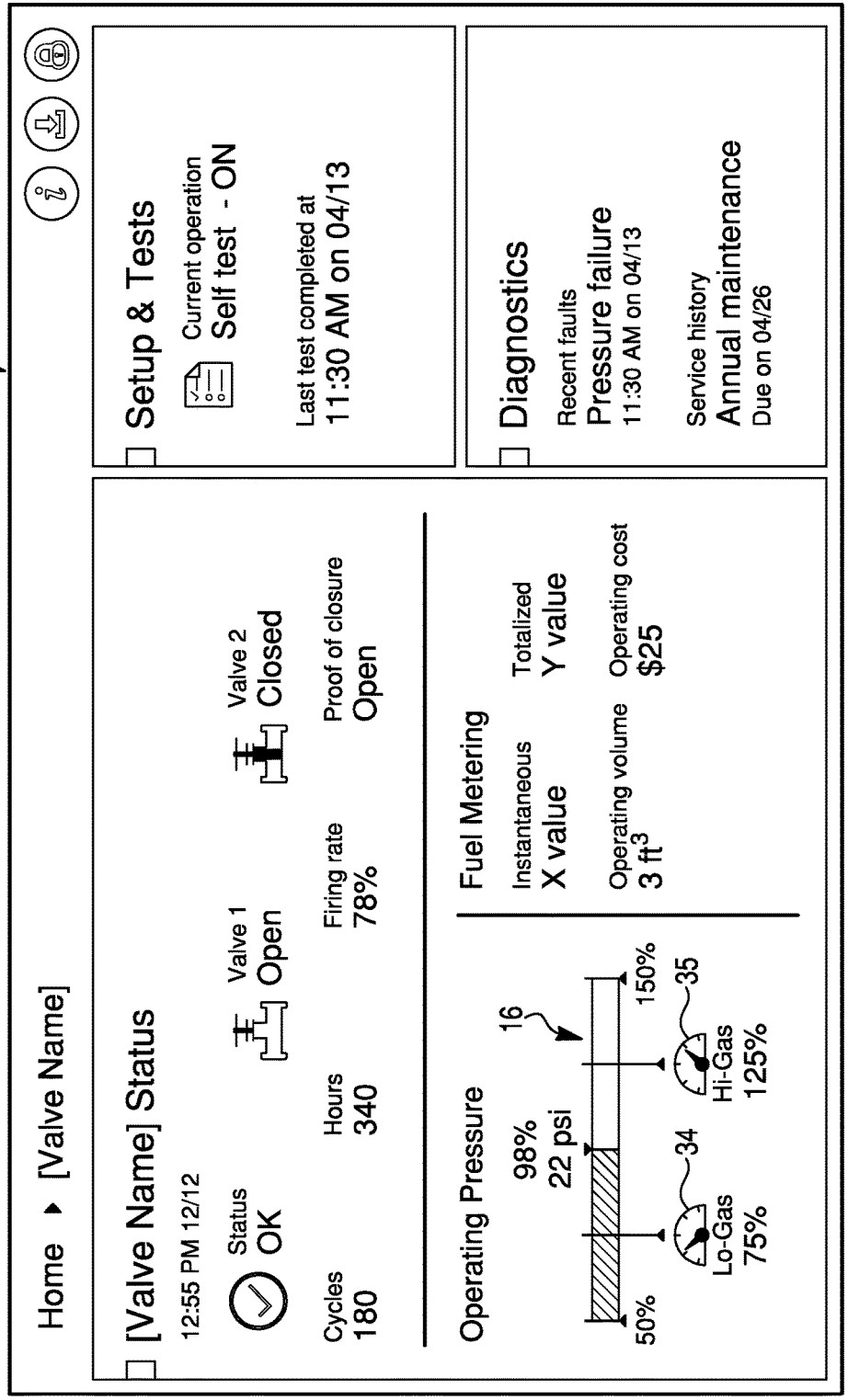
FIG. 12 is a diagram of a screen providing information on value status incorporating status, valve position, cycles, hours, firing rate, operating pressure, fuel metering, and so forth.

A diagram of FIG. 12 shows a screen 50 providing information on value status incorporating status, valve position, cycles, hours, firing rate, operating pressure, fuel metering, and so forth. A setup and tests section may indicate either untested settings or current operation such as a self-test and when the last test was conducted. A diagnostics section may indicate issues such as pressure failure. The section may indicate service history and due dates for items such as an annual maintenance.

Figure 13:
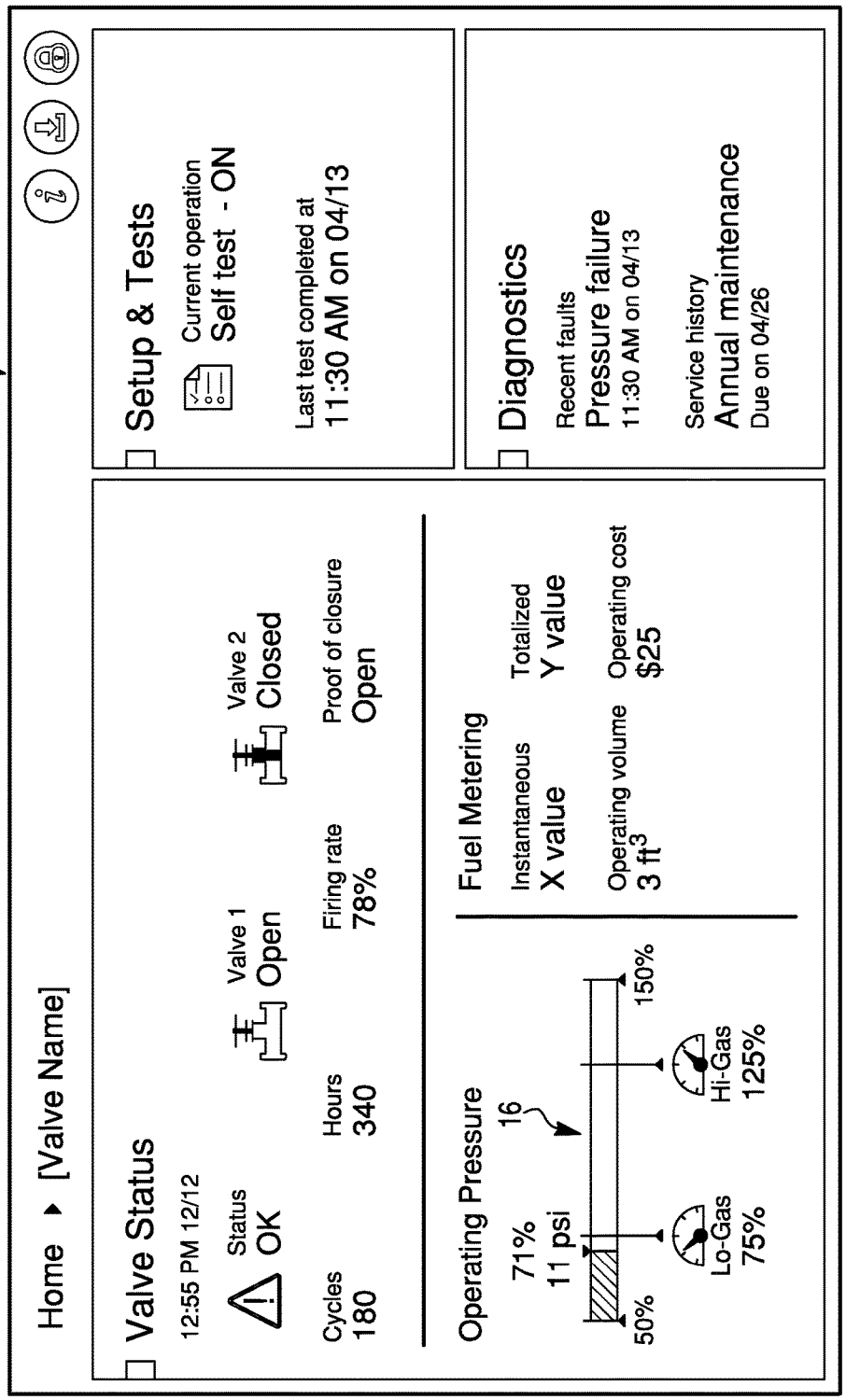
FIG. 13 is a diagram of a screen that may reveal similar information as the screen in FIG. 12 except that it reveals an operating pressure below the limit of the low gas pressure icon.

FIG. 13 is a diagram of a screen 51 that may reveal similar information as screen 50 of FIG. 12 except that it reveals an operating pressure below the limit of the low gas pressure icon 34. A shaded portion to the left of icon 34 may turn red or some other color to get the attention of a viewer of screen 51.

To recap, a system for setting up a valve may incorporate a display screen having a control interface, a gas valve having an actuator, a pressure sensor at the gas valve, a processor connected to the actuator, pressure sensor and the display screen. The display screen may incorporate an indication of current operating pressure, a first icon representing a first limit switch, a second icon representing a second limit switch, and a graph revealing an indication of operating pressure over time. The first icon may be moveable along a bar for testing a low pressure limit setpoint of the first limit switch. The second icon may be moveable along the bar for testing a high pressure limit setpoint of the second limit switch.

The graph that reveals the operating pressure over time may incorporate a first horizontal line indicating a low gas pressure limit setpoint, and a second horizontal line indicating a high gas pressure limit setpoint.

If the first icon is moved along the first portion of the bar and the low pressure limit setpoint reaches a first predefined pressure, then the first portion of the bar may change from a first color to a second color. If the second icon is moved along the second portion of the bar and the high pressure limit setpoint reaches a second predefined pressure, then the second portion of the bar may change from a third color to a fourth color.

The screen may incorporate a button for resetting to an original setpoint of one or more items selected from a group incorporating the low pressure limit setpoint and the high pressure limit setpoint.

If the low pressure limit reaches a first predefined pressure, then a tripping of the first limit switch may occur. If the high pressure limit reaches a second predefined pressure, then a tripping of the second switch may occur. The tripping of the first limit switch or the second limit switch may open an interlock string that results in removal of power to the actuator that causes the gas valve to close.

An approach for setting up a valve, may incorporate connecting a display to a processor, and connecting a pressure sensor to the processor, to sense fluid pressure at a valve. The processor may construct a first switch icon on a screen of the display to represent a low gas pressure limit switch, and a second switch icon on the screen to represent a high gas pressure limit switch. The processor may insert a first setpoint indicator on the screen for a low gas pressure limit switch, and a second setpoint indicator on the screen for a high gas pressure limit switch. The processor may place an operating pressure icon on the screen upon which the first and second switch icons are moveable for testing a setpoint for the low gas pressure limit switch and testing a setpoint for the high gas pressure limit switch, respectively.

The operating pressure icon may indicate operating pressure. A switch icon may be selected from a group incorporating the first and second switch icons. The switch icon may be dragged along the operating pressure icon until it reaches the operating pressure at the valve. The screen may be captured.

A hard reset button at the valve may be pushed to reset the low gas pressure and high gas pressure limit switches to the original settings and to out of test mode.

If the switch icon is dragged on the operating pressure icon until it reaches the operating pressure, then the operating pressure icon may have a first color that switches to a second color for drawing attention of an observer at the screen on the display.

The approach may further incorporate revealing operating pressure versus time with a graph. The graph may indicate the setpoint for the low gas pressure limit switch and the setpoint for the high gas pressure limit switch.

The setpoint for the low gas pressure limit switch may be displayed as a percentage of the current operating pressure. The setpoint for the high gas pressure limit switch may be displayed as a percentage of the current operating pressure.

A mechanism for a valve setup may incorporate a processor, and a display showing a screen as a user interface connected to the processor. The user interface may incorporate a slider bar that has a limit icon representing a limit switch that has a pressure setting, and the limit icon may be moved along and past a point representing an operating pressure of fluid to a valve for verifying that a limit switch with that setting, has tripped for locking out a system having the valve for controlling a flow of fluid, and as soon as the limit switch has tripped during a test mode, the pressure setting of the limit switch may automatically be set back to an original limit setting.

The operating pressure may be shown real-time and plotted as pressure versus time in a graph shown on the screen. The graph may show high and low limits of pressure. The high and low limits of pressure may be adjustable.

The high and low limits of pressure may be set in view of the actual operating pressure to prevent limit trips caused by variations of the actual operating pressure.

The limits of pressure may be changed by adjusting a limit percentage in view of one or more limit bars that move and indicate how close the actual operating pressure is from the high and low limits of pressure.

The graph may provide historical data plotted as a function of time to indicate when and how long the actual operating pressure has been relative to the high and low limits indicated on the graph.

The slider limit bar may have a low fluid pressure icon on one end and a high fluid pressure icon on another end.

The icon on the slider limit bar may be moved to test a high fluid pressure limit switch or a low fluid pressure limit switch.

A limit switch icon on the slider limit bar may be slid in a first direction forward or a second direction backward to a point where the limit switch meets the actual fluid operating pressure and trips the limit switch.

After the limit switch has been tested with a trip of the switch, the switch limit may be auto-restored to an original setting.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for setting up a valve comprising:
   a display screen having a control interface;
   a gas valve having an actuator configured to open and close the gas valve;
   a pressure sensor at the gas valve;
   a processor connected to the actuator, pressure sensor and the display screen; and
   wherein:
   the display screen comprises:
      an indication of current operating pressure;
      a first icon representing a first limit switch;
      a second icon representing a second limit switch; and
      a graph, including a first bar indicating a low limit of pressure that corresponds to the first icon and a second bar indicating a high limit of pressure that corresponds to the second icon, the graph revealing an indication of operating pressure over time, wherein the first bar moves in accordance with input on the first icon and the second bar moves in accordance with input on the second icon and adjusting the first bar and the second bar on the graph visually indicates how close the actual operating pressure is from the high and low limits of pressure; and
   wherein:
      the first icon is moveable along a bar for testing the low pressure limit of the first limit switch, wherein moving the first icon to different values along the bar controls the first bar to move to corresponding values on the graph; and
      the second icon is moveable along the bar for testing the high pressure limit of the second limit switch, wherein moving the second icon to different values along the bar controls the second bar to move to corresponding values on the graph.

2. The system of claim 1, wherein the graph that reveals the indication of operating pressure over time comprises:
   a first horizontal line indicating a low gas pressure limit setpoint; and
   a second horizontal line indicating a high gas pressure limit setpoint.

3. The system of claim 1, wherein:
   if the first icon is moved along a first portion of the bar and the low pressure limit setpoint reaches a first predefined pressure, then the first portion of the bar changes from a first color to a second color; and
   if the second icon is moved along a second portion of the bar and the high pressure limit setpoint reaches a second predefined pressure, then the second portion of the bar changes from a third color to a fourth color.

4. The system of claim 3, wherein the screen comprises a button for resetting to an original setpoint of one or more items selected from a group comprising the low pressure limit setpoint and the high pressure limit setpoint.

5. The system of claim 2, wherein:
   if the low pressure limit reaches a first predefined pressure, then a tripping of the first limit switch occurs;
   if the high pressure limit reaches a second predefined pressure, then a tripping of the second switch occurs; and
   the tripping of the first limit switch or the second limit switch results in removal of power to the actuator that causes the gas valve to close.

* * * * *